Nov. 10, 1970 A. H. BOBECK ET AL 3,540,019

SINGLE WALL DOMAIN DEVICE

Filed March 4, 1968 2 Sheets-Sheet 1

INVENTORS A. H. BOBECK
R. F. FISCHER
BY Herbert M. Shapiro
ATTORNEY

United States Patent Office 3,540,019
Patented Nov. 10, 1970

3,540,019
SINGLE WALL DOMAIN DEVICE
Andrew H. Bobeck, Chatham, and Robert F. Fischer, Livingston, N.J., assignors to Bell Telephone Laboratories, Incorporated, Murray Hill and Berkeley Heights, N.J., a corporation of New York
Filed Mar. 4, 1968, Ser. No. 710,031
Int. Cl. G11c *11/14, 19/00*
U.S. Cl. 340—174 10 Claims

ABSTRACT OF THE DISCLOSURE

Propagation of single wall domains in a sheet of magnetic material is achieved in the absence of multiphase propagation wiring. Unidirectional movement of domains along propagation channels in a magnetic sheet is effected by a superimposed magnetic layer patterned to convert alternate expansion and contraction of domains into translation along prescribed axes. Propagation is powered by a modulated bias field in one alternation of which all domains in the sheet first expand and then contract.

FIELD OF THE INVENTION

This invention relates to magnetic devices and more particularly to such devices wherein single wall reverse-magnetized domains are moved in a sheet of magnetic material.

BACKGROUND OF THE INVENTION

A single wall domain is a magnetic domain which is bounded by a single domain wall closing upon itself and having a geometry independent of the boundary of the sheet in which such a domain is moved. The domain conveniently assumes the shape of a circle (top view) which has a stable diameter determined by the material parameters. A bias field of a polarity to contract domains insures that domains can be moved as stable entities. Single wall domain propagation devices are described in the Bell System Technical Journal, October 1967, volume 46, pages 1901 et seq.

The movement of a single wall domain is accomplished normally by consecutively offset localized fields (actually field gradients) of a polarity to attract domains. A domain follows the consecutive attracting fields along any arbitrary path from input to output positions in the sheet. A three-phase progagation operation provides the directionality along a selected propagation path in a manner well understood in the art.

The pattern of the propagation wiring, employed to generate the attracting fields when pulsed, normally assumes a geometry dictated by the material in which the domains are moved. A typical material is a rare earth orthoferrite. These materials have preferred directions for magnetization normal to the plane of the sheet. If the sheet is saturated magnetically in one direction, say a negative direction, normal to the plane of the sheet, the magnetization in the single wall domain is in the opposite direction, a positive direction. The domain, then, may be represented (top view) as an encircled plus sign and the propagation wiring pattern is conveniently in the form of consecutively offset closed loops to correspond to the circular geometry of the domain. This wiring pattern is described in copending application Ser. No. 579,931, filed Sept. 16, 1966 for A. H. Bobeck, U. F. Gianola, R. C. Sherwood, and W. Shockley (now patent 3,460,116).

The geometry of the propagation wiring pattern, in turn, determines the packing density in magnetic sheets in which single wall domains are moved. Current requirements for generating propagation fields dictate minimum cross-sectional areas for the propagation conductors. When next adjacent conductors are closely spaced, the thickness of the conductors cannot be made large easily without reducing the spacing between adjacent conductors at the risk of causing short circuits. Consequently, the width of the conductors is relatively large to accommodate the desired current. Further, the loop configuration requires a minimum dimension along the axis of propagation dictated by the width of two conductors plus the opening encompassed thereby for each domain position. The photoresist techniques permit depositions in the sub-mil range with reproducible results. But the minimum domain position size, of course, is several times larger than that dimension because of the loop pattern. Also, not all domain positions may be occupied because the three-phase propagation cycle which provides directionality along a propagation channel requires next adjacent domains to occupy, for example, positions coupled by every third loop. Thus as much as about ten mils are alloted for each bit location. Yet, domains in the submicron size have been observed.

An object of this invention is to reduce the complexity of the propagation wiring pattern in a manner to increase the packing density of single wall domain devices.

BRIEF DESCRIPTION OF THE INVENTION

The invention is based on the realization that the sheet in which single wall domains are moved may be made essentially unidirectional to single wall domains. In one specific embodiment patterns of wedge-shaped areas of a high permeability material are formed on a sheet of orthoferrite. In addition, a varying field is generated uniformly throughout the sheet. In response to the varying field, domains in the sheet alternately expand and contract. The patterns of high permeability material convert the expansion and contraction of domains into a net displacement and the domains advance in the sheet in the direction of the wedge tips in the absence of propagation wiring and separate drivers.

In another embodiment, a pattern of high permeability material is deposited on a sheet of a rare earth orthoferrite material and interconnected wedge shapes are etched away exposing the orthoferrite sheet. In response to a varying bias field, the domains move in a direction away from the tips of the wedges.

A mass serial memory may be made where the domain size is a function of the material parameters. Neither propagation wiring nor external connections are required except, possibly, at input and output positions. With domain size in the micron range, packing densities of up to $10^8$ per square inch may be realized.

A feature of this invention, accordingly, is a device including a sheet of material in which single wall domains are moved, and means imposing unidirectional movement to domains alternately expanded and contracted therein in response to a varying uniform bias field.

DETAILED DESCRIPTION

Figure 1:
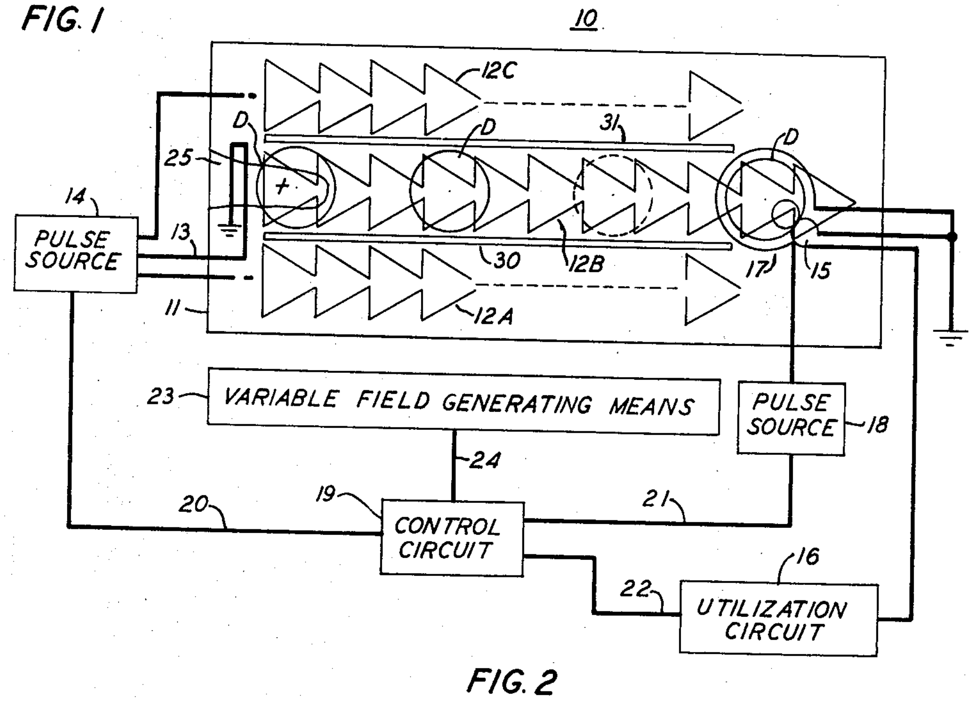
FIG. 1 is a schematic view of a memory in accordance with this invention.

FIG. 1 shows a domain propagation device 10 including a sheet or platelet 11 of, illustratively thulium orthoferrite. Sheet 11 includes thereon overlay patterns 12A, 12B, and 12C of interconnected wedge or arrow-shaped areas of a magnetic material such as a zero magnetostrictive composition of NiFe. The material of patterns 12*i* is characterized by a high permeability or a low coercivity so that the magnetization therein may be set by the external fields which are characteristic of the domain patterns of the orthoferrites.

The patterns 12*i* extend across sheet 11 from input to output positions for domains, each interconnected set of wedges defining a single propagation channel. Several channels are indicated. Only the channel defined by pattern 12B is shown fully. The input position of that channel is defined by a conductor 13 connected between a pulse source 14 and ground. The output position is defined partially by a figure 8 conductor 15 connected between a utilization circuit 16 and ground and partially by a conductor 17 which encompasses both loops of the figure 8. Conductor 17 is connected between a pulse source 18 and ground. Pulse sources 14 and 18 and utilization circuit 16 are connected to a control circuit 19 via conductors 20, 21 and 22, respectively.

A variable field generating means 23 indicated by a block, so numbered, conveniently generates throughout sheet 11 a uniform bias field illustratively to maintain a preferred diameter for domains in sheet 11. For a sheet of sufficient coercivity, the uniform bias field may be zero oersteds. Means 23 conveniently includes apparatus which superimposes a variable bias field on the constant bias to alternately contract and expand (viz the area of) domains in the sheet in a controllable manner. The apparatus, for example, may comprise a coil about sheet 11 oriented to generate a magnetic field normal to the plane of the sheet, when activated. Means 23 is connected to control circuit 19 via conductor 24 to this end.

Strips 30 and 31, typically of the material of patterns 12*i*, conveniently, help define the various propagation channels and permit relatively high margins. Strips 30 and 31 may be thought of as providing patterns of free poles along which domains can propagate. The strips may be defined, alternatively, by current carrying conductors or by appropriately magnetized magnetic tapes. In the last-mentioned arrangement, the tape may be wedge-shaped to define unidirectional channels in the absence of the wedge-shaped overlay. Such an embodiment would enable the paths defined thereby to be programmed by merely changing the geometry of the tape or the magnetized sections thereon.

The various sources and circuits may be any such elements capable of operating in accordance with this invention.

Each channel of FIG. 1 operates as a shift register circuit. Information is stored in the shift register as the presence of a domain (1) or the absence of a domain (0). The presence of a domain in FIG. 1 is shown by an encircled plus sign designated D. The absence of a domain is indicated by a broken circle. The illustrative stored information then is 1101, as viewed from left to right in FIG. 1.

Consecutive bits are stored at the input position of a register synchronously with the movement of information in the register. The movement of information in the register from input to output positions is synchronous and in response to the variations in the bias field as is explained further hereinafter. The storage of the presence and absence of a domain at an input position the depends on the presence and absence of a pulse in conductor 13, respectively, each time the bias field alternates. Thus, a pulse may be applied to conductor 13, illustratively every third time the bias is most strongly negative as is discussed in more detail hereinafter. The presence of a pulse at that time results in the "nucleation" (viz breaking off) of a domain from a source of positive magnetization, 25, into the input position for propagation.

The propagation operation comprises a cyclical expansion and contraction of all domains in sheet 11. As the bias becomes less negative the domains expand. As the bias becomes more negative they contract.

Figure 2:
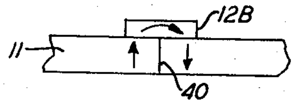
FIGS. 2, 3A, 3B, 3C, 4A, 4B, 4C, 5, 6A, 6B, and 6C are schematic views of alternative portions of the memory of FIG. 1 showing magnetic conditions therein during operation.

The high permeability patterns 12*i* on sheet 11 turn the alternate expansion and contraction of domains into a net displacement. FIG. 2 shows a portion of sheet 11 in cross section. The magnetization of a domain is represented by the upward directed arrow and that of the remainder of the sheet is represented by the downward directed arrow. A domain wall 40 is defined therebetween. A portion of pattern 12B is shown overlying wall 40 enabling flux closure therethrough. A minimum magnetostatic energy condition is realized then when wall 40 is positioned with respect to pattern 12B such that as much effective material in pattern 12B is to the right as there is to the left as viewed in FIG. 2. Pattern 12B, however, is not symmetrical with respect to any given domain wall. Thus if any given domain is alternatively expanded and contracted the wall thereabout moves in a manner to maximize the amount of overlay still coupled thereto. The bias field, then, although it causes alternating expansion and contraction of domains, does so in a propagation channel where the superimposed pattern necessitated a unidirectional movement of domains so altered.

Figure 3A:
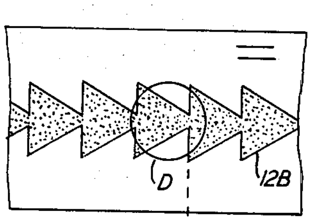
Figure 3B:
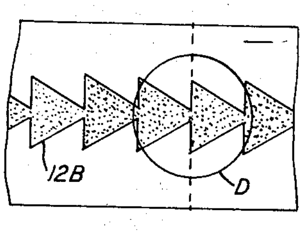
Figure 3C:
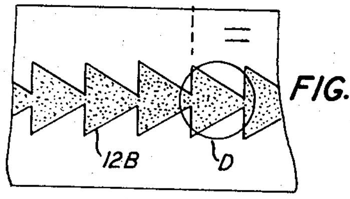

The mechanism for unidirectional movement of domains is explained further in connection with FIGS. 3A, 3B, and 3C. Let us assume that a domain D is stable in the position shown for it in FIG. 3A where the maximum amount of the wall thereabout overlies material of pattern 12B. The bias field is at a relatively high negative intensity indicated by the double minus sign in FIG. 3A. The field now goes positive (viz, less negative) as indicated by the single minus sign in FIG. 3B. The domain, in response, expands. But, if the domain expands to the right (i.e., forward) the wall thereabout couples gradually less of the material of pattern 12B. On the other hand, if the domain expands to the left, the wall must abruptly decouple the material of pattern 12B over a relatively large portion of the wall length. Naturally, the former alternative is energetically preferable and the wall expands to the positions shown for it in FIG. 3B.

The bias field now goes more negative as indicated by the double minus sign in FIG. 3C. The domain contracts. In this case, however, the left (trailing) portion of the wall decouples gradually less and less of the material of pattern 12B as it moves to the right but the right-hand side of the wall must decouple the material of pattern 12B over a relatively large portion of its length in order to move to the left as viewed. Consequently, the domain contracts by the movement of the left side of the wall to the right into the position shown in FIG. 3C. The cycle now repeats, each time expanding and contracting the domain resulting in a net movement of the domain (and the absence of a domain) to the right as shown. The stored bits reach the output position consecutively as further alternations of the bias field are provided.

The presence and absence of domains in the output position is detected by utilization circuit 16 in synchronism with the bias field alternations under the control of control circuit 19. The output conductor, advantageously of a figure 8 configuration, exhibits a current pulse if a domain is collapsed there in response to a positive pulse in conductor 17. The pulse in conductor 17 generates, illustratively, a "collapse" field in the output position for interrogation purposes. The figure 8 geometry of conductor 15 is arranged so that only one loop thereof couples a domain in the output position as shown in FIG. 1. The design and orientation of conductor 15 are to reduce noise. If a synchronizing pulse concurrently enables circuit 16, the collapse of a domain is recorded indicating a binary one. If a domain is absent from the output position during interrogation, a binary zero is indicated.

Faraday or Kerr optical effects permit optical detection of the presence and absence of domains in a well-known manner also.

Figure 4A:
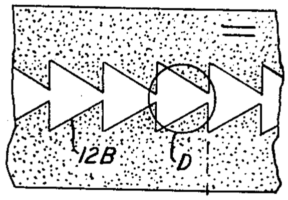

FIG. 4A shows an alternative configuration for patterns **12*i*** which configuration is the negative of that shown in FIG. 3A. Whereas the wedge-shaped pattern defines the areas of high permeability material in FIG. 3A, it defines the areas from which high permeability material is absent in FIG. 4A. The pattern is provided by well-known deposition and photoresist techniques.

The propagation of domains in a device employing the alternative high permeability pattern is also in response to a varying bias field as described above. But movement of domains is to the left as viewed in FIG. 4A rather than to the right in response to that varying field.

Figure 4B:
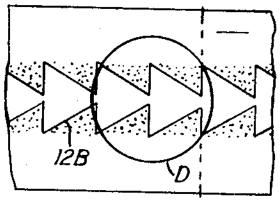
Figure 4C:
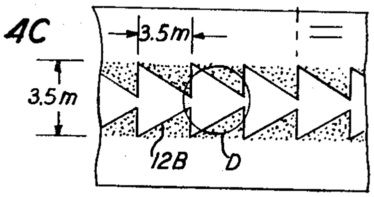

The consecutive positions for a domain D in response to one alternation of the varying bias are depicted in FIGS. 4A, 4B, and 4C. It should be clear that although the alternation of the bias field powers the movement of domains, that movement is made unidirectional by the overlay patterns **12*i*** and it is the shape of the overlay which determines the direction of movement. It has been found that only portions of the overlay shown in FIG. 4A are necessary for unidirectional movement of domains. Only the necessary portions are shown in FIGS. 4B and 4C.

Figure 5:
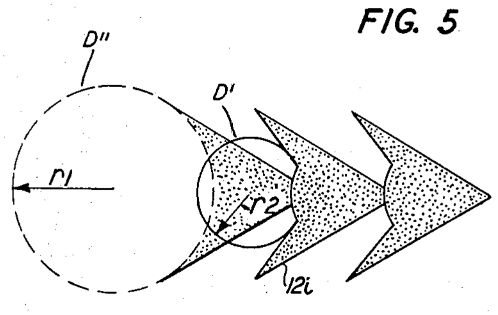

The patterns which determine unidirectional movement of domains are conveniently shaped to conform to the shape of a domain wall. It has been stated that the forward portion of a wall of a moving domain should move over gradually less of the material of patterns **12*i* while the trailing portion of the wall should abruptly decouple the material over a relatively large portion during an expand portion of the propagation cycle. Consequently, the shape of patterns 12*i* provides better and better margins the more closely the trailing portion of a wall conforms to a portion of patterns 12*i*. This is shown in FIG. 5 as a curvature for patterns 12*i*** which is a compromise between that of domain D when it is contracted and that when it is expanded. Each wedge-shaped portion of the pattern shown in FIG. 5 includes a large curved area having a radium $r1$ equal to the radius of an expanded domain D being propagated therealong. A part of the curved area just mentioned includes a small reverse curve of radius $r2$ smaller than $r1$ (i.e., $r1=2r2$) as shown in the figure. The domain D′ is shown conforming to one small curved section in the figure. An imaginary domain D″, shown as a broken circle, is shown conforming to a large curved area in a next preceding position for domains.

Margin requirements determine the relative size of the wedge-shaped portions of patterns **12*i*** with respect to the domain diameter.

It is clear from the foregoing description that a domain expands and contracts during operation in accordance with this invention. But, the diameter of a domain has a stable range of about three to one in any particular material. That is to say, a domain has a minimum diameter below which it collapses spontaneously and, also, a maximum diameter above which it runs out uncontrollably into a strip shape. The ratio between the maximum and minimum diameters is, say, three to one.

Consider the case where a domain corresponds to one wedge of pattern 12B in FIG. 1 when contracted and two wedges when expanded. The domain radius then may be chosen to vary between 5/4 the minimum radius to 5/2 the minimum radius. The domain size may vary one-fifth in both the contracted state and in the expanded state. This provides about a 20 percent margin in domain size and a corresponding margin in the bias field variation.

The domain should just latch onto a third wedge when in an expanded state but avoid latching onto a fourth (compare FIGS. 3A and 3B). Consequently, the domain size when expanded may vary about 50 percent providing corresponding margins for the bias field.

If the domain encompasses two wedges, of FIG. 1, when in the contracted state and three wedges when expanded, the margins change. We now have a ratio of two to three between the domain size in the contracted and expanded states. In the contracted state, we may choose the domain radius to be 1.5 times the minimum radius. In the expanded state the radius is 2.25 times the minimum radius. This leads to 33 percent margins in both the contracted state and in the expanded state. The margins may be seen to be improved over those of the previous example.

Any selected geometry for patterns **12*i*** then is determined by a compromise between the various margin considerations. One suitable overlay included wedges, of the type shown in FIG. 4C, of 2,500 A. thick permalloy, having a geometry of 3.5 x 3.5 mils as shown in FIG. 4C. The overlay permitted the movement of domains having contracted and expanded diameters of 4 and 8 mils respectively in a sheet of thulium orthoferrite. The sheet had a coercivity on the order of $\frac{1}{10}$ oersted and a thickness of 2 mils. A bias field of 30 oersteds with variations of $\pm 1$ oersted effected operation as described. Photoresist techniques currently permit wedge shapes of the order of 0.2 mil. Experimentation indicates that the domains moved in accordance with this invention have diameters of the same order as the wedges.

Figure 6A:
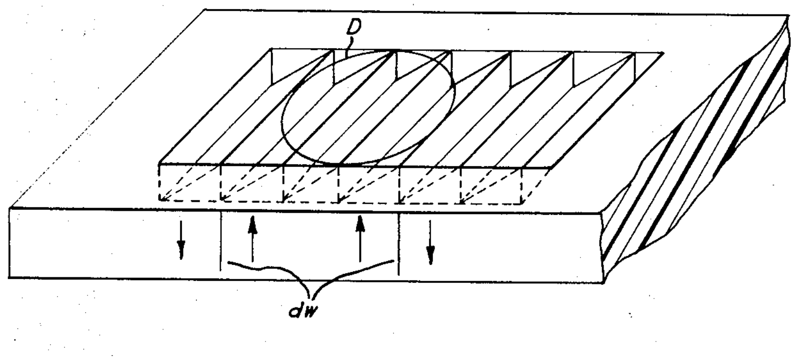
Figure 6B:
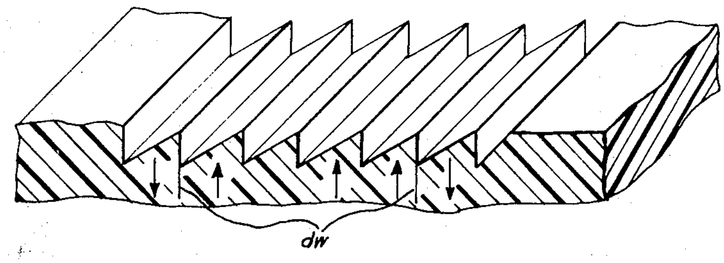
Figure 6C:
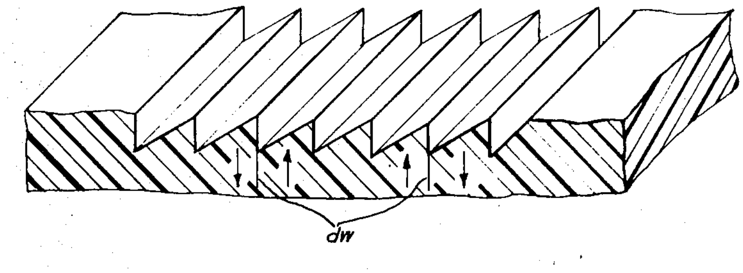

The preference of a domain to change its position by gradual decoupling from an adjacent overlay is similar to a preference for a wall to change its cross-sectional length gradually. FIG. 6A shows, partially in phantom, a sheet in which single wall domains are moved. The sheet has a sawtooth cross-section which defines a unidirectional channel for domains. The domain wall is represented again by a circle D and the position of the domain wall thereabout is represented as lines *dw*. The magnetization between lines *dw* is represented by upward directed arrows (+) and the magnetization outside the lines is represented by downward directed arrows. When a bias field, normal to the plane of the sheet in which the domain is moved, is modulated to alternately expand and contract the domain, the domain moves to the right as viewed. The rightmost (leading) portion of the wall need expand only gradually to move to the right because of the gradual slope to the sawtooth. Yet the leftmost (trailing) portion of the wall must expand abruptly in order for it to move to the left. Consequently, the rightmost portion advances to the right and the leftmost portion retains its position. The result is shown in FIG. 6B. When the domain contracts, the leading portion of the wall has to change its length abruptly whereas the trailing portion need only change its length gradually. Consequently, the domain contracts by moving its trailing portion to the right as viewed. The final position for the wall, after one bias alternation, is shown in FIG. 6C. The domain D is usually relatively large with respect to the sawtooth geometry but is shown of like size in FIG. 6A for convenience.

The invention has been described in terms of eliminating the usual propagation winding pattern in the propagation of single wall domains. It should be clear, however, that a propagation winding pattern enables selective movement of domains. Of course, a unidirectional channel in accordance with this invention is useful to permit a simplification of the multiphase wiring pattern to a two-phase or perhaps a single phase organization.

What has been described is considered merely illustrative of the principles of this invention. Accordingly, other and varied modifications may be made therein by one skilled in the art without departing from the spirit and scope of this invention.

What is claimed is:

1. In combination, a sheet of magnetic material in which single wall domains can be propagated, means for defining a unidirectional channel in said sheet for domains alternately expanded and contracted in response to variations in a bias field, said last-mentioned means comprising means having an asymmetric geometry along the direction of movement and being disposed to couple domains so expanded and contracted for causing a net displacement thereof in said sheet, and means for generating substantially uniformly in said sheet a bias field varying in a manner to alternately expand and contract domains in said sheet.

2. A combination in accordance with claim 1 including means selectively providing single wall domains in said sheet, and means detecting the presence and absence of domains in said sheet.

3. A combination in accordance with claim 1 wherein said sheet comprises a material having a preferred direction of magnetization normal to the plane of said sheet.

4. A combination in accordance with claim 3 wherein said means for defining said unidirectional channels comprises a layer of magnetic material overlying said sheet, said layer of magnetic material defining a repetitive pattern along each channel of propagation for domains, said pattern being of a geometry to permit gradual decoupling between the wall of domains moved in said sheet and said overlayer for domain movement in one direction along said channel and abrupt decoupling for said wall for domain movement in the opposite direction along said channel.

5. A combination in accordance with claim 4 wherein said overlayer comprises high permeability material.

6. A combination in accordance with claim 4 wherein said overlayer comprises material of a low coercivity to permit the setting of the magnetization therein by the external field of a domain in said propagation channel.

7. A combination in accordance with claim 5 wherein said overlayer comprises a pattern of interconnected wedges each including an enlarged portion and a tip portion.

8. A combination in accordance with claim 7 wherein each of said enlarged portions is curved to conform substantially to a domain wall of domains propagated in the associated propagation channel.

9. A combination in accordance with claim 8 wherein each of said enlarged portions includes a portion having an opposite curvature.

10. A combination in accordance with claim 3 wherein said means defining unidirectional channels for propagation comprises portions of said sheet wherein the cross-section thereof is of a sawtooth configuration.

References Cited

UNITED STATES PATENTS 3,438,016 4/1969 Spain -------------- 340—174

JAMES W. MOFFITT, Primary Examiner